(No Model.)  2 Sheets—Sheet 2.
H. A. KING.
VELOCIPEDE.
No. 327,397.  Patented Sept. 29, 1885.
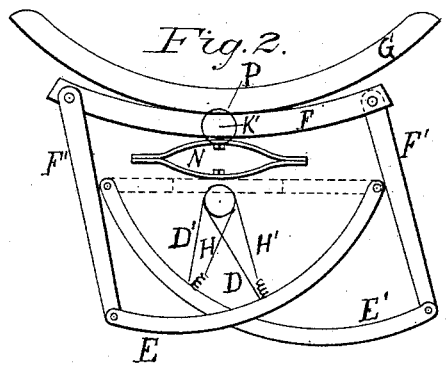
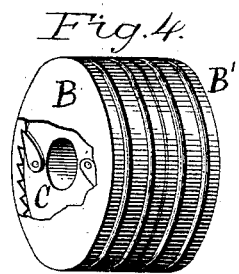
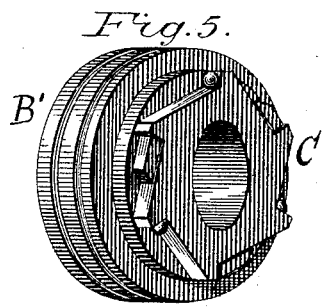
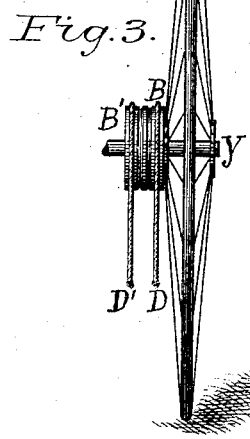
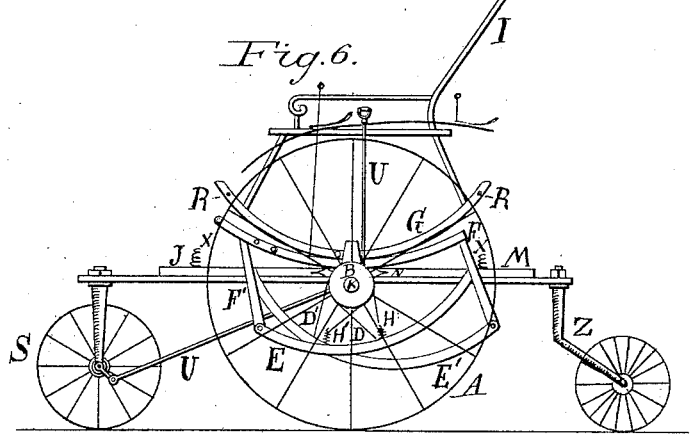
Witnesses:
Oscar Knab
Allen Webster
Inventor.
Homer A. King.

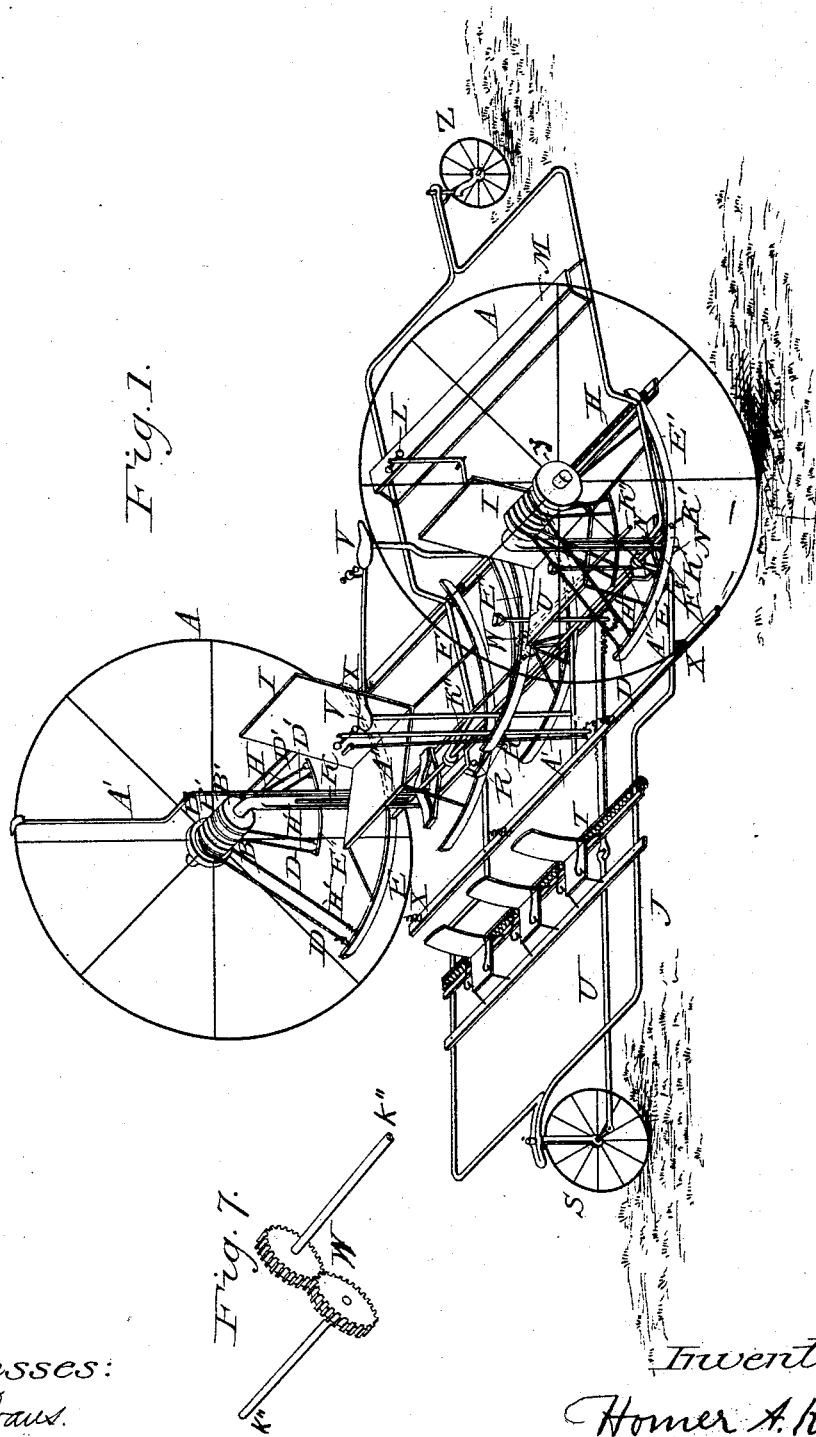

UNITED STATES PATENT OFFICE.

HOMER A. KING, OF SPRINGFIELD, MASSACHUSETTS.

VELOCIPEDE.

SPECIFICATION forming part of Letters Patent No. 327,397, dated September 29, 1885.

Application filed September 4, 1884. (No model.)

*To all whom it may concern:*

Be it known that I, HOMER A. KING, a citizen of the United States, residing at Springfield, in the county of Hampden and State of Massachusetts, have invented new and useful Improvements in Motor-Carriages, which improvements are fully set forth in the following specification, the accompanying drawings making part of the specification.

My invention relates to improvements in motor-carriages; and the object of my improvements is to avoid the irregular crank motion and provide a simple and better means of applying power to machinery, and especially to propel safe passenger, express, and pleasure carriages, suited to carry one or more ladies or gentlemen, or a whole family, easily and swiftly propelled on a street, common road, on rails, on water, or anywhere, with or without steam or electricity, or by power exerted by one or more riders, and avoiding the unpleasant jarring and jolting usually experienced by riders on bicycles and tricycles.

Similar letters of reference indicate corresponding parts.

Referring to the drawings, Figure 1 is a view in perspective of a three-track motor-carriage of my elbow or drop axle style, with front steering-wheel, S, rear caster-wheel, z, and two driving-wheels, A, propelled by rocking chair or chairs and levers, with connection-straps to my double-box driving mechanism, transmitting power to the driving-wheels, causing them to rotate in one direction. Figs. 2, 3, 4, and 5 are enlarged views of different parts of the driving mechanism of my invention. Fig. 6 is a side elevation view of a motor-carriage constructed as a two-track tricycle, with one driving-wheel, A, with a straight axle with one end in the hub of the driving-wheel and the other end joined to a hollow bar connecting the steering-wheel S and the caster-wheel z, and propelled by power transmitted to the driving-wheel by the driving mechanism of my invention. Fig. 7 is an enlarged view of the connection W in Fig. 1, there partly hidden by one of the levers, with treadle R.

In Fig. 1 the elbow or drop axle K connects the driving-wheels A, and the carriage-frames J and M project over and hook upon the axle K', which rests upon springs N, and these upon axle K; but springs N may be used suspended from axle K above axle K'. Other axles, K'', may be used, as in Fig. 1, above axle K', to the outer ends of which are tightly fastened the short united levers, and on their inner ends, on either side of the connection W, are tightly fastened the levers with treadles R. The axles K'' are secured by braces near their inner ends and by the link F'' at the outer ends to the axle K', and move up and down with it upon the springs N. When the springs N are not used, axle K' is not needed, as the frames J and M and the rocking chairs and lower end levers are in that case fitted loosely to axle K, as they now are to axle K'.

The levers E and E' in Fig. 1 are united in one piece, but in Fig. 6 the lever E has one end connected to the front end of lever with treadle R and the other end hinged to a bar projecting back of the axle K, and the lever E' has one end connected to the rear end of the lever with treadle R and the other end to the bar projecting in front of the axle K; but the construction as shown in Fig. 1 may be preferable.

The pawl-cage C of each of the two driving-wheels in Fig. 1 is provided with two sets of boxes, B and B', and with four sets of pawls, and is fastened to and becomes a part of the hub y.

In Fig. 6 two sets of pawls are used on each end of the hub of the driving-wheel, connecting with one set of two propelling-boxes, B and B', on each end of the hub y. By the use of two sets of the propelling-boxes B and B' on an extension of the inner end of each hub of the two driving-wheels in Fig. 1 one set of boxes may be connected with the levers with treadles R and the other set is connected with the long levers E and E', operated by the motion of the rocking chairs I, and thus a rapid motion can be imparted to the carriage by the riders on the seats V, while one or both of the rocking chairs move slowly or are at rest.

The propelling-boxes B and B' are made either with ratchets in the inside to engage the pawls, as shown in the drawings, or left smooth to clutch the connection pawl balls or wedges, which move in the grooves, as shown.

In Fig. 1 there are a double set of propelling-boxes, B and B', and two sets of the united levers E and E'; hence the following description of the straps will be more easily understood in connection with Fig. 6.

One end of the strap D is attached to the lever E in front of and below the hub y, and the other end, passing in front of and over and around, is attached to the box B. One end of the strap D' is attached similarly to the lever E' and the box B'. These connection-straps may be elastic, if desired. One end of the strap or cord H' is attached to the box B', and, passing up in front and over and down on the rear side of B', is attached to a spring attached to the lever E near where the strap D is attached. The strap or cord H is similarly attached to box B and to the lever E'. These straps may be made of any suitable material, and if otherwise elastic they are attached directly to levers E and E' without the intervention of a spring, and no spring is needed, nor need the cords be elastic if springs N are not used; but with elastic cords the use of springs N is made feasible.

The brake A', with handle A", acts by eccentrics below, pressing the brake down on the wheel to retard the motion or to stop the vehicle when desired, and is held up by a spring when not pressed down by the rider. The pawls in cage C may be covered or partly covered with leather or other suitable material, to render their action nearly noiseless, or the balls or wedges shown may be used. One or more express or package racks or baskets, T, may be attached.

These carriages may be propelled in part or wholly by using the removable handle L, which may be attached quickly to any lever or rocker by one or more of the riders on any seat, or they may be propelled by foot-power acting upon the treadles R by a rider or riders on seat or seats V. These carriages may also be propelled in part or wholly by the use of a rocking chair or chairs, as follows: A person sitting in the chair rocks backward, bearing down the rear end of lever E' and drawing out the strap or cord D', turning the driving-box B' forward to engage by its ratchets or clutch the pawls in cage C, rotating the wheel forward, and at the same time by the strap H the box B is turned backward, ready to engage the pawls when the chair rocks forward, depressing the front end of lever E, unwinding the strap D, turning the box B forward, thus propelling the carriage forward, and at the same time the propelling-box B' is brought back by the strap H', thus adjusting themselves automatically, the forward motion of one box bringing the other box back into position. These propelling-boxes may be used on a revolving axle or shaft the same as they are used on hub y.

My elbow or drop axle carriage will be preferable, especially when the driving-wheels are of great diameter; but in either style the weight is largely thrown on the driving-wheels by the levers E and E' and the straps D and D', thus avoiding pressure on axle K, and preventing much friction.

To avoid tipping the chairs or seats backward, or any jerking up of the front part, the rear parts of the chair when rocking backward strike upon springs x, fastened to the frame of the caster-wheel z, which is connected to the steering-wheel S by a hollow bar, as shown in Fig. 6, or the frame is loosely hung upon axle K', as shown in Fig. 1, or to axle K when springs N are not used. The caster-wheel runs on the ground above the level of the driving-wheel when the driving-wheel is in a hollow, or below when the driving-wheel is passing over a convex surface.

If the diameter of the driving-wheel be great, the diameter of the propelling-boxes be small, the connection-straps be long, and the sweep of the levers be also long, these carriages may be propelled with great speed, especially by the riders on seats V.

The handle of the steering rod U, attached to the rocking chair, oscillates by and with the motion of the chair, and being connected to move the horizontal rod U back and forth the wheel S is turned to the right or left, as desired, and the vehicle is thus steered, and also by the handle in front of one of the seats V.

The downward pressure of one foot upon one treadle R raises, by the connection W, the other foot of the same rider on the other treadle R, and thus saves much fatigue, besides rendering it an easy task for one person to propel the vehicle. When there are two riders on the tandem seats, the downward pressure upon one treadle by one foot of one of the riders also raises the other treadle on the other end of the same united or double levers on the same side of the tandem, each rider thus assisting the other to raise the feet, thus saving much fatigue.

Having thus described my invention, what I claim as new, and desire to secure by Letters Patent, is—

1. A vehicle propelled by a rocking chair in which are combined levers and connection to propelling-boxes and driving-wheel, the combination and arrangement being such that each movement of the rocking chair forward or backward causing the rotation of the driving-wheel in one direction.

2. Connection between the lever with treadle R on one side of seat V, and the lever with treadle on the other side of seat V, and with connection to propelling-boxes and driving-wheel, causing the depression of one treadle on one side of the seat to elevate the treadle on the other side of the same seat, for the purpose set forth.

3. Levers projecting in opposite directions, each receiving power and transmitting it by connection to propelling-boxes and to a driving-wheel, causing the wheel to rotate in one direction.

4. A double-box propelling mechanism, in combination, to levers and to a driving-wheel, receiving power and transmitting it to the driving-wheel, causing the wheel to rotate in one direction, the combination and arrangement being such that the depression of a lever turning one propelling-box forward brings the other propelling-box back into position to again receive power and transmit it to the driving-wheel.

5. Springs N, in combination with axle, levers, and connection to propelling-boxes and driving-wheel, for the purpose set forth.

6. The oscillating steering-rod U, in combination with rocking chair I, the upper end of the steering-rod oscillating with and by the motion of the rocking chair, keeping the handle of the steering-rod always within reach of the hand of the rider in the rocking chair, for convenience in steering when the rocking chair is in any position, substantially as set forth.

7. The combination, in a vehicle, of a truck or caster wheel attachment, z, with rocking chair I, and with connection to propelling-boxes and driving-wheel, the truck attachment arresting the movement of the chair when it is rocked far backward, preventing any jerking up of the front part or tipping backward, substantially as set forth.

HOMER A. KING.

Witnesses:
LOUIS PAPANTI,
L. B. GOLDTHWAIT.